United States Patent [19]
Jax et al.

[11] Patent Number: 5,215,409
[45] Date of Patent: Jun. 1, 1993

[54] DEVICE FOR SEALING OFF AND MONITORING A VOLUME

[75] Inventors: Peter Jax, Erlangen; Klaus Ruthrof, Nürnberg; Karl-Heinz Bode, Ingolstadt; Klaus Günther, Hamburg, all of Fed. Rep. of Germany

[73] Assignee: Siemens Aktiengesellschaft, Munich, Fed. Rep. of Germany

[21] Appl. No.: 730,619

[22] Filed: Jul. 16, 1991

Related U.S. Application Data

[63] Continuation-in-part of Ser. No. 714,257, Jun. 12, 1991, abandoned.

Foreign Application Priority Data

[30] Mar. 22, 1991 [DE] Fed. Rep. of Germany ....... 4109520

[51] Int. Cl.$^5$ .............................................. B09B 1/00
[52] U.S. Cl. ................................................... 405/129
[58] Field of Search ............................. 220/469, 565; 73/40.5 R, 49.2 T; 405/36, 38, 43, 53, 55, 128, 129, 266–270

[56] References Cited

U.S. PATENT DOCUMENTS

| | | | |
|---|---|---|---|
| 3,977,233 | 8/1976 | Issel | 73/40.5 R |
| 4,439,062 | 3/1984 | Kingsbury | 405/129 |
| 4,709,577 | 12/1987 | Thompson | 73/49.2 T X |
| 4,753,551 | 6/1988 | Brueggemann et al. | 405/128 |
| 4,846,604 | 7/1989 | Holtmann | 405/128 |
| 4,974,739 | 12/1990 | Gelin | 220/469 X |
| 5,046,353 | 9/1991 | Thompson | 73/40.5 R X |

FOREIGN PATENT DOCUMENTS

| | | | |
|---|---|---|---|
| 329825 | 8/1989 | European Pat. Off. | 405/128 |
| 2431907 | 7/1977 | Fed. Rep. of Germany | |
| 3540715 | 5/1987 | Fed. Rep. of Germany | 405/128 |
| 3737569 | 5/1989 | Fed. Rep. of Germany | |
| 3430965 | 11/1989 | Fed. Rep. of Germany | |
| 3831188 | 3/1990 | Fed. Rep. of Germany | |

OTHER PUBLICATIONS

"Die Rollins-Hochdeponie mit neuen Kontrollsystemen", Dipl.-Ing. Ludwig Fensch, Umwelttechnik, Apr. 1987, pp. 196–200.
Siemens Publication "LEOS Leckagen erkennen und orten".
Umwelt & Technik, Sep. 1989, p. 16, "Deponiebau".
Mittwoch, May 16, 1990, No. 94, p. B7, "Handelsblatt".
Richter-Sanierung "Die naturgerechte Lösung für Altlast-Deponien und kontaminierte Standorte".
Entsorgungs Praxis, Oct. 1990 (10), pp. 579–580 "Basisabdichtung für Altdeponien".
Siemens Publication "Long-term Monitoring of Landfills with LEOS", Oct. 1988.
Siemens Publication "Leak Detection and Location System", 1988.
Umwelt & Technik, Oct. 1990, "Sicherheits-abdichtungen", pp. 34–36.

Primary Examiner—Dennis L. Taylor
Assistant Examiner—John Ricci
Attorney, Agent, or Firm—Herbert L. Lerner; Laurence A. Greenberg

[57] ABSTRACT

A device for sealing off and monitoring a volume includes two seals. Support elements space the seals apart from one another. At least one conduit is disposed between the seals and the support elements. The at least one conduit has an inlet opening and an outlet opening for a medium. At least one sensor is associated with the outlet line. The two seals have edges being tightly joined to one another leaving the inlet and outlet openings of the at least one conduit free. The support elements are formed of a flow-hindering material. At least two devices may be tightly joined together to form a field, with the outlet opening of the at least one conduit of one of the at least two devices being connected to the inlet opening of the at least one conduit of another of the at least two devices.

20 Claims, 4 Drawing Sheets

DEVICE FOR SEALING OFF AND MONITORING A VOLUME

CROSS-REFERENCE TO RELATED APPLICATION

This application is a continuation-in-part of U.S. application Ser. No. 714,257, filed Jun. 12, 1991, now abandoned.

The invention relates to a device for sealing off and monitoring a volume or body such as garbage. It also relates to an assembly or configuration of such devices.

A Siemens brochure entitled "Long-Term Monitoring of Landfills with LEOS", order no. A19100-U501-A130-X-7600, Oct. 1988, discloses a device for sealing off a garbage dump or landfill. The landfill is provided with a foil, sheet or seal, which may be disposed underneath the garbage, in order to prevent toxic substances from polluting the groundwater. However, the seal may also be placed on top of the garbage to prevent the leaking and escape of toxic substances due to an ingress of rain water. In order to ensure that a leak in such a seal can be found early, the device includes LEOS hoses, which are known per se, on the side of the seal facing away from the garbage. The hoses are connected to a central monitoring system.

A LEOS hose and devices useful for its operation are known from German Patent DE-PS 24 31 907, corresponding to U.S. Pat. No. 3,977,233. That hose is permeable to toxic substances. A pump is disposed at one end of the hose and with it individual volumes of some medium, such as gas, are pumped through the hose in succession at intervals over time. In that way, the hose is scavenged at a constant scavenging frequency at regular time intervals. Sensors that are sensitive to toxic substances are located at the other end of the hose. If toxic substances reach the area surrounding the hose, they diffuse into the hose and are brought to the sensors the next time that the medium is pumped. Since the medium flows at a known speed, the location at which toxic substances have entered the hose between two scavenging operations can be determined precisely from the time difference between the time when the pump is turned on and the time of sensor response. The quantity of toxic substances can also be determined. The contents of U.S. Pat. No. 3,977,233 is incorporated herein by reference.

If a leak in the seal occurs outside the immediate vicinity of the LEOS hose, the escaped substances that must be detected are spread over some volume before they can reach the LEOS hose. If the propagation speeds in the volume vary, the LEOS hose can be reached simultaneously at several points. Additionally, the substance to be detected may reach the LEOS hose first at a point relatively far away from the leak. Moreover, the substance may reach a relatively long segment of hose and diffuse into it between two scavenging operations. In that case all that can be ascertained is that the leak is located somewhere in the vicinity of that segment. Consequently, the determination as to the site of the leak may be relatively seriously in error. With the known configuration, a leak in the seal cannot always be located precisely. Furthermore, laying the seal and laying the LEOS hoses require two operations.

The invention is based on the observation that it would be desirable to provide for a two-fold barrier or double protection if the body or volume to be sealed, such as garbage, is sensitive. It is also based on the observation that it would be desirable to determine whether it is the first or second of said barriers that has a leak, if such a leak occurs.

It is accordingly an object of the invention to provide a device for sealing off and monitoring a volume, which overcomes the hereinafore-mentioned disadvantages of the heretofore-known devices of this general type and with which the site of a leak in a seal can be located more precisely. Moreover, it should be possible to lay the device quickly and reliably. It is another object of the invention to provide double protection for the object or volume, and it is still another object of the invention to provide for an assembly for sealing off and monitoring a garbage body, which assembly is composed of individual elements which can easily be laid in the open air (even under rough conditions).

With the foregoing and other objects in view there is provided, in accordance with the invention, an element or a device for sealing off and monitoring a volume, comprising two seals, support elements spacing the seals apart from one another, at least one conduit disposed between the seals and the support elements, the at least one conduit having an inlet opening and an outlet opening for a medium, and at least one sensor associated with the outlet opening, the two seals having edges being tightly joined to one another leaving the inlet and outlet openings of the at least one conduit free, and the support elements being formed of a fluid-permeable, yet flow-hindering material.

An advantage afforded by this device is that after a leak in one of the seals, a substance to be detected is guided to the conduit in a defined manner. The substance does not flow through some surrounding area of unknown structure, but instead penetrates through the support elements to the conduit. The flow resistance of the support elements or of the voids in the support elements is known and is constant at least in each axis of the support element. The substance that has seeped in initially passes from the leak in the seal to the conduit over the shortest distance, namely at right angles to the conduit. It is only subsequently that the substance that has seeped in enters adjoining points of the conduit. During the period of time between the occurrence of the leak and the next scavenging operation, a spreading out of the substance in the conduit takes place, with a maximum extent that indicates the site of the leak. If the flow resistance of a support element is low, the time differences between the arrivals over the direct route and over the somewhat longer routes are quite short. In the period of time between the occurrence of the leak and the next scavenging operation, a wide, flat spread of the substance could develop in the conduit, with a maximum extent that could be detected. However, because the support elements are made of a flow-hindering material according to the invention, the diffused substance moves so slowly in a support element that the time difference between the arrival at various points of the conduit is measurably long, even when the difference in distance is slight. In the period between the occurrence of the leak and the next scavenging operation, when there is a predetermined scavenging frequency, only a narrow, steep spread of the substance can then develop in the conduit, and its maximum extent can be readily detected by a sensor. Consequently, it is easy to determine at which site the substance first reached the conduit. The leak must then be located on a line at right angles to this point on the conduit. It is possible to provide only one sensor for a certain substance. It is also possible to provide a plurality of sensors for various substances, in particular for a gas such as methane and for a liquid such as water.

With the device according to the invention, a leak in the seal can be located well.

Due to the fixed joining of the seals and the conduits, the device according to the invention can be laid rapidly in only a single operation.

If different substances are to be expected above and below a device that has been laid, then a conclusion can be drawn as to whether a leak is in the upper or lower seal from the type of substance detected. The type of substance can be detected because suitable sensors are provided. For instance, the device according to the invention may seal a garbage dump. In that case, the entry of nearly pure water would suggest a leak in the seal facing away from the dump.

In accordance with another feature of the invention, the conduit is formed by a permeable hose. The hose known from German Patent DE-PS 24 31 907 corresponding to U.S. Pat. No. 3,977,233 may be suitable.

In accordance with a further feature of the invention, the conduit in the device for sealing off and monitoring a volume is separated from the adjacent support elements by permeable diffusion layers. In that case, no hose is necessary.

In accordance with another feature of the invention, the hose is surrounded by a filler material. A drying agent for eliminating residual moisture in the device may be used as a filler material or as a component of the support elements. As a result, the accuracy of measurement for moisture that has entered through a leak can be improved. For instance, a moisture sensor is used to find where water has entered.

In accordance with an additional feature of the invention, the support elements have a lesser flow resistance at right angles to the conduit than parallel to the conduit. This has the advantage of causing a substance that has penetrated a support element through a leak in a seal to propagate in an elliptical shape instead of a circular one. The long axis of the ellipse is aligned at right angles to the conduit. Consequently a still narrower, steeper spread of the substance in the conduit occurs than when a flow-hindering material, which allows the same flow speed in all directions, is used as the support element. Thus the site of the leak can also be determined more accurately.

In accordance with yet another feature of the invention, the material of the support elements, which has a lower flow resistance at right angles to the conduit than parallel to the conduit may, for instance, be a woven fabric oriented at right angles to the conduit.

However, in accordance with yet a further feature of the invention, the material of the support elements may instead be made up of capillaries or tubules and so forth, that are oriented at right angles to the conduit.

In accordance with yet another feature of the invention, the two seals are tightly joined together, for instance at their edges, by profile sections or profile bodies (pieces) slipped onto them. Such profile sections are easy to manipulate. However, the two seals may also be welded together.

In accordance with yet an additional feature of the invention, the inlet and outlet openings for the medium that flows through the conduit may be joined together, forming a loop. The sensor and a pump are then disposed in the loop. As long as there is no leak, the medium that flows through the conduit does not need to be refreshed continuously.

In accordance with again another feature of the invention, the loop has a closable feed opening and a closable drain opening. The loop may be completely or partly closable between the drain opening and the feed opening. The medium can be fed in and drained as needed. The loop may be interrupted, so that all of the medium that has been fed in is drained out again. Instead, with a partly closed communication between the drain opening and the feed opening, only some of the medium in the loop may have to be replaced.

In accordance with again a further feature of the invention, there is provided a filter disposed in the outlet line or in a bypass around the outlet line, and this filter can remove substances that have entered the loop through a leak.

In accordance with again another feature of the invention, the filter is a catalytic filter. Particularly if the filter is disposed in a bypass around the outlet line, the filter can be replaced or cleaned without impairing the integrity of the loop. It is possible for the substances removed from the filter during the cleaning opening to be measured.

To this end, in accordance with again an additional feature of the invention, the filter can be connected to both a cleaning apparatus and a sensor, in order to enable integral, sensitive measurement.

Besides the immediate determination of imported toxic substances by the sensor, it is also possible to determine the entry of toxic substances between two changes of filters, in the manner described. If a sensor fails, it is accordingly possible to learn at least whether a leak did occur between two changes of filters.

In accordance with still another feature of the invention, in order to clean the filter of the retained substances, the filter may be provided with a heater so as to clear the filter of the retained substances by heating them.

In accordance with still a further feature of the invention, the filter may also be charged with water vapor or water. In this way as well, the substances retained in the filter can be released again.

With the objects of the invention in view, there is also provided an assembly for sealing off and monitoring a volume, comprising at least two devices or elements being tightly joined together to form a field, each of the devices including two seals, support elements spacing the seals apart from one another, at least one conduit disposed between the seals and the support elements, the at least one conduit having an inlet opening and an outlet opening for a medium, the two seals having edges being tightly joined to one another leaving the inlet and outlet openings of the at least one conduit free, and the support elements being formed of a fluid-permeable, yet flow-hindering material; wherein the outlet opening of the at least one conduit of one of the at least two devices is connected to the inlet opening of the at least one conduit of another of the at least two devices, and at least one sensor associated with the outlet opening of the other of said at least two devices.

An advantage of such a configuration is that sealing off a large area, for instance a garbage dump or landfill, does not require providing a relatively large, one-piece device that would be difficult to transport. Another advantage is that such an assembly or field can be formed rapidly by simple means from individual, easily manipulated devices. This field can perform the task of a very large device for sealing and monitoring a volume.

In accordance with another feature of the invention, the adjacent elements may be welded together, for instance, to form such a field or assembly.

However, they may also be joined in some other way. For instance, profile sections or bodies (pieces) that form the edge of one element and that receive the two seals of this element may also have devices for receiving the seals of the adjoining elements. Accordingly, only one profile section is then located between two adjacent elements. A weld seam may nevertheless be necessary to assure a tight connection.

In accordance with a concomitant feature of the invention, the conduits of adjacent elements may be joined together through plug connections, for instance. However, other types of connections, such as welded connections, are also possible.

The various devices or elements may be joined into a field in such a way that the entire field is penetrated by only one conduit, which covers the entire field in a meandering pattern. Then the entire field has only one inlet line and one outlet line and requires only one sensor in common. Such a sensor may take the form of a multiple sensor, e.g. for gas and fluid, as mentioned above.

The device according to the invention has the advantage of permitting a leak in a seal to be located accurately.

Moreover, by ascertaining which substance has entered it, it can be determined whether the substance being detected originated inside or outside the monitored volume. In order to achieve this, a plurality of detectors or sensors for various substances, such as gas, toxic substances and water, are necessary. In monitoring a landfill, two sensors associated with one field of elements will suffice.

Other features which are considered as characteristic for the invention are set forth in the appended claims.

Although the invention is illustrated and described herein as embodied in a device for sealing off and monitoring a volume, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
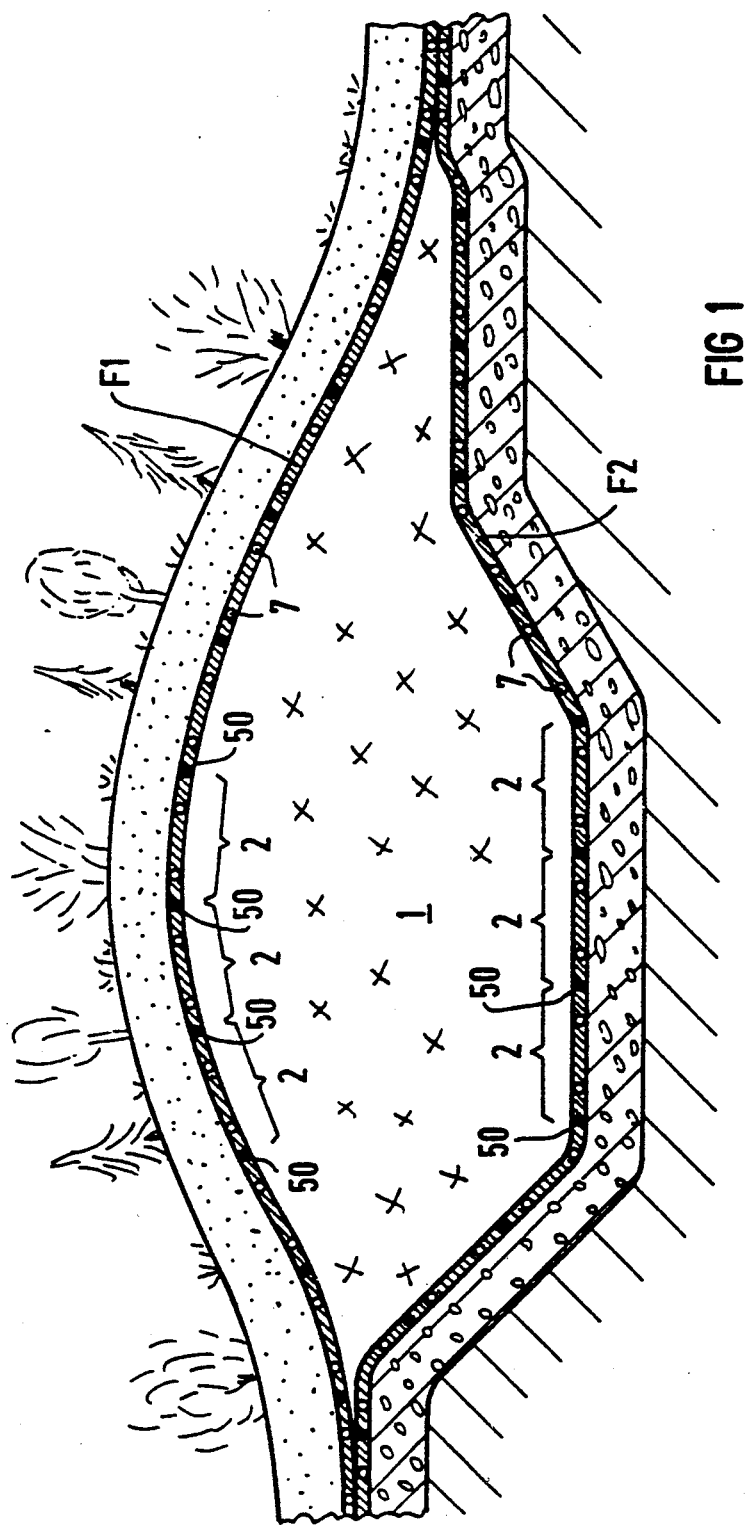
FIG. 1 is a fragmentary, diagrammatic, sectional view of a landfill sealed by fields which are composed of devices in accordance with the invention.

Referring now to the figures of the drawing in detail and first, particularly, to FIG. 1 thereof, there is seen a garbage body or volume 1 of a landfill which is sealed off at the top and bottom by an assembly or field F1 and F2, respectively. Each field F1 and F2 comprises a plurality of devices 2 that are constructed in accordance with the invention. Each element or device 2 is provided with two channels or conduits 7 extending parallel to each other. The devices 2 are tightly joined to each other at joining locations 50. By means of the upper field F1 the possible penetration of water from above into the garbage body 1 and the possible exit of gas from the body 1 in upward direction is monitored, and a corresponding leak is localized. By means of the lower field F2 the possible exit of gas from the garbage body 1 in downward direction and the penetration of humidity from below in upward direction into the garbage body 1 is monitored, and a corresponding leak is localized.

Figure 2:
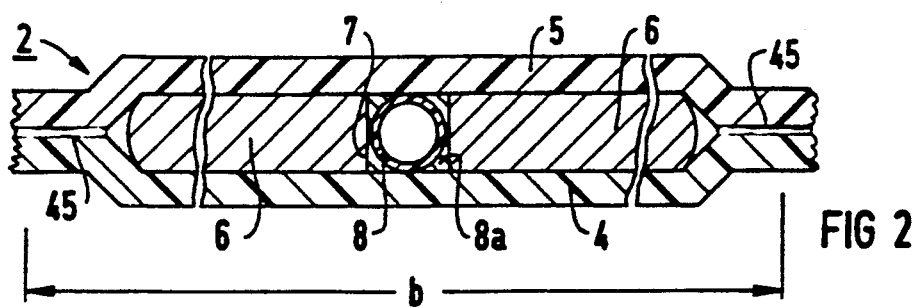
FIG. 2 is a sectional view of a device according to the invention.

As shown in FIG. 2, the device 2 includes a lower seal 4 and an upper seal 5, preferably made of a plastic such as polyethylene. The two seals 4 and 5 are spaced apart from one another by support elements 6. A conduit 7, which penetrates the device 2 at right angles to the plane of the drawing, is left free between the seals 4 and 5 and the support elements 6. Except for an inlet opening and an outlet opening of the conduit 7, the device 2 is tightly closed at its edges, for instance by welding the upper seal 5 to the lower seal 4. The welding seam is denoted as 45. A permeable hose 8, which is equivalent to the hollow line of U.S. Pat. No. 3,977,233, is laid in the conduit 7 as shown in FIG. 2. The hose 8 is preferably a LEOS hose that is able to transport gas and water vapor very well over a long distance. The hose 8 is surrounded by a filler material 8a.

The support elements 6 are formed of a homogeneous fluid-permeable, yet flow-hindering material. They may instead be formed of some material that has a lower flow resistance at right angles to the conduit 7 than parallel to the conduit 7. One such material may be an aligned woven cloth. The material may also be made up of capillaries that extend parallel and are aligned at right angles to the conduit 7. The filler material 8a may be polyethylene or another plastic. It is a material that serves as a moisture barrier. However, it is not absolutely compulsory to provide the filler material 8a.

Figure 3:
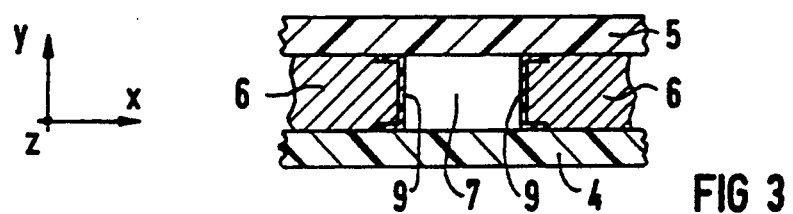
FIG. 3 is a fragmentary, sectional view of another embodiment of the device according to the invention.

The width b of the device 2 may be 3 to 5 meters. Its length may be, for example, 50 meters. The height of the elements 6 which defines the distance between the seals 4, 5, may be e.g. 6 to 14 mm, preferably 8 mm. The outer diameter of the hose 8 may be e.g. 4 to 8 mm. Such elements 2 are flexible and can easily be laid. According to FIG. 3, the hose 8 may also be dispensed with. In that case, the conduit 7 is separated from the adjacent support elements 6 by permeable diffusion layers or walls 9. Such a conduit 7 is equivalent to the hollow lines of U.S. Pat. No. 3,977,233.

Figure 4:
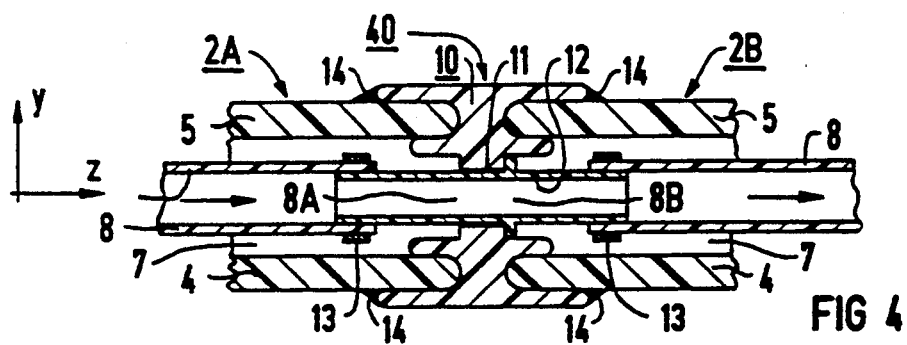
FIG. 4 is a fragmentary, sectional view of an apparatus for joining two devices according to the invention.

In FIG. 4, the two seals 4 and 5 of a first element 2A are joined together at their edges by a profile body or section 10 which is slipped onto them. At the same time, the profile section 10 serves to receive the seals 4 and 5 of an adjacent second element 2B. The connection location of the elements 2A, 2B is shown at 40. In this way, a plurality of elements can be joined into one configuration or field. In order to connect the conduits 7 or hoses 8 of the two elements 2A, 2B to be joined, the profile section 10 has an insertion opening 11. A rigid sheath 12 is disposed there and firmly welded inside the insertion opening The hoses 8 may be connected to the sheath 12, for instance on both sides, by clamps 13. Wherever it is unnecessary to connect adjacent conduits 7, adjacent elements 2A and 2B may also be joined together by a simple weld seam. In the construction shown in FIG. 4, weld seams 14 are necessary for sealing purposes.

Figure 5:
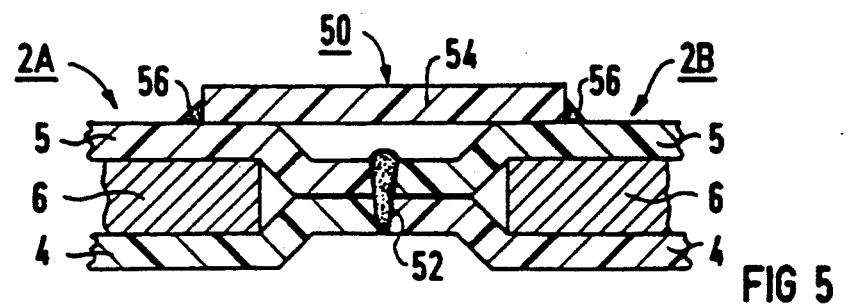
FIG. 5 is a fragmentary, sectional view of a connection between two adjacent devices without conduit ducting.

FIG. 5 shows a connection location 50 having a weld connection 52 between adjacent elements 2A, 2B outside a conduit duct. Instead of a weld seam 52 directly at the point where the seals 4 and 5 are joined, this connection location 50 may also be formed by a plate 54 that is tightly welded to the two adjacent elements 2A, 2B. The welding seams are denoted as 56.

Figure 6:
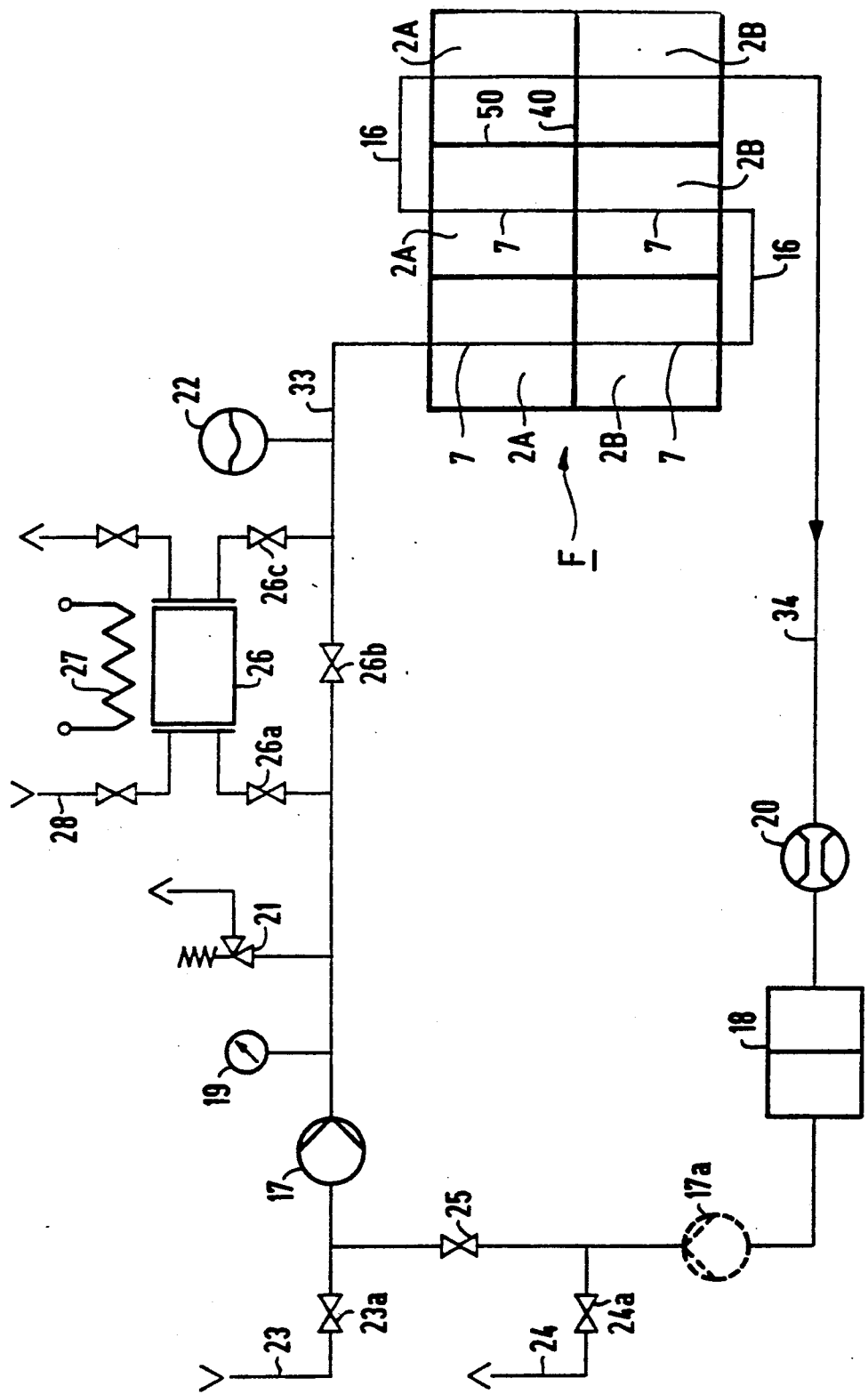
FIG. 6 is a diagrammatic and schematic view of a configuration of a plurality of devices according to the invention, with associated equipment.

FIG. 6 shows a configuration that has been selected in which the elements 2 are joined together into a field F. The conduits 7 pass through the field F in a meandering pattern. This requires U-shaped connecting pieces 16 for the rows of elements 2A, 2B. The conduits 7 are a component of a circulatory loop having an inlet line 33 and an outlet line 34 for some suitable medium, which may be dry air, for instance. A pump 17 and one or more sensors 18 for substances to be detected are disposed in the loop. In particular, two sensor units are shown to be connected in series. A pressure meter 19, a flow meter 20 and a safety valve 21 along with a pressure holder 22 may also be provided. In the loop, the medium is carried at regular intervals through the elements 2, as is known from U.S. Pat. No. 3,977,233. If there is a leak in one of the elements 2A, 2B during this process, an invading substance is detected in the sensor 18 during the next pumping phase. The loop has a closable feed line with an opening for air and a closable drain line 24 with an opening, for example, which are provided with valves 23a and 23b, respectively. Between the feed line 23 and the drain line 24, the loop can be partly or completely closed by a further valve 25. The result is that a closed loop, a partly open loop or an open loop is selectively available. Instead of being constructed as a pressure pump 17 disposed downstream of the feed line 23, the pump may also be constructed as a suction pump 17a disposed upstream of the drain line 24. A filter 26 is disposed in a bypass, in order to clean the medium in the loop. The filter 26 may be a mechanical filter, a filter acting absorptively (molecular sieve, activated charcoal filter, silica gel, etc), or a filter that operates with catalytic combustion. In order to clean the filter 26, it can be disconnected from the loop by means of the bypass lines. For cleaning, a heater 27 is provided for the filter 26. The substances being removed are then carried away through a scavenging line 28, or they are carried to further sensors for integral measurement. The scavenging line 28 may also be charged with hot water or steam for expelling the substances to be detected.

Since the medium is passed through the loop at fixed time intervals (scavenging operations), conclusions can be drawn as to the site of a leak in one of the elements 2 from the time of detection of a substance in the sensor or sensors 18. If there is a leak in one seal 4 or 5 of the elements 2A, 2B, the substance that has entered is transported into the conduit 7 after some period of time and from there is carried by the medium to the sensor 18.

Referably, two sensors are provided. The first sensor is sensitive to gas delivered by the dump site, such as methane, and the second sensor is sensitive to humidity, such as water. From the reading of these sensors it can be determined whether the upper seal 5 or the lower seal 4 has a leak.

Figure 7:
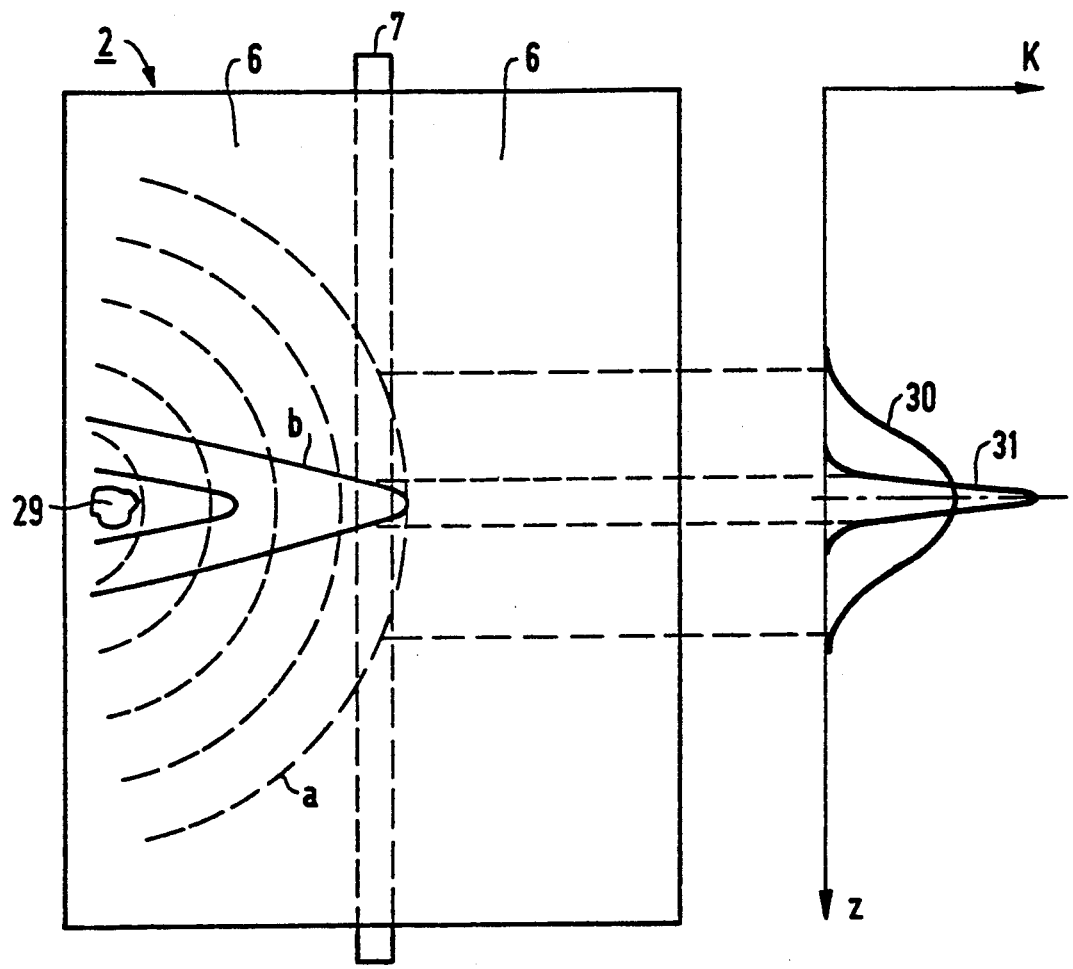
FIG. 7 is a graph of a flow course beginning at the site of a leak.

FIG. 7 shows that because of the support elements 6 which are formed of a flow-hindering material, a substance that has penetrated from a leak 29 is propagated slowly and uniformly in a circular pattern a. This assures that the substance that has traveled in from the leak 29 first reaches the conduit 7 over the shortest route, at right angles to the conduit 7. It is also assured that between the occurrence of the leak and the next scavenging of the conduit, only a small portion of the conduit 7 receives the substance. A spread 30 of the substance occurs in the conduit immediately before the next scavenging. The spread 30 is shown in FIG. 7. Reference symbol K refers to the concentration of the substance in the conduit 7, and reference symbol Z is the site in the conduit 7. This spread reaches the sensor 18 shown in FIG. 6. There the maximum extent of the spread 30 and thus the site of the leak can only be determined relatively accurately if the spread 30 is relatively wide. The accuracy can be increased if the material of the support elements 6 has a lower flow resistance at right angles to the conduit than parallel to the conduit. In that case, the substance that has penetrated from the leak 29 in fact spreads out in the form of an ellipse b, having a long axis which is disposed at right angles to the conduit 7. From this it can be concluded that in the period of time between the occurrence of the leak and the next scavenging of the conduit 7, the substance will only reach a relatively short segment of the conduit 7. The result in the conduit 7 immediately before the next scavenging is a spread 31 having a sharply defined maximum extent which can be determined more accurately in the sensor 18 shown in FIG. 6. The site of the leak can be determined with the same accuracy.

With the device and the configuration according to the invention, a leak or a plurality of leaks in a seal can be located very accurately, and depending on the composition of the medium that has penetrated, a distinction can be made as to whether the leak occurred in the upper seal 5 or the lower seal 4. The point on the conduit 7 that is closest to the leak 29 can be determined.

We claim:

1. A device for sealing off and monitoring a volume, comprising:
    two seals,
    support elements spacing said seals apart form one another, at least one conduit disposed between said seals and said support elements,
    said at least one conduit having an inlet opening and an outlet opening for a medium, and
    at least one sensor associated with said outlet opening,
    said two seals having edges being tightly joined to one another leaving said inlet and outlet openings of said at least one conduit free,
    said support elements being formed of a fluid-permeable, yet flow-hindering material, and
    permeable diffusion layers separating said at least one conduit from said adjacent support elements.

2. The device according to claim 1, wherein said two seals have edges, and including a profile body joining said edges to one another.

3. The device according to claim 1, wherein said inlet opening and outlet opening for the medium are joined together forming a loop in which said sensor is disposed, and including a pump disposed in said loop.

4. The device according to claim 3, wherein said loop has a closable feed opening, a closable drain opening, and means for at least partly closing said loop between said feed opening and said drain opening.

5. The device according to claim 1, including an outlet line connected to said outlet opening, and a filter disposed in said outlet line for receiving toxic substances.

6. The device according to claim 5, wherein said filter is a catalytic filter.

7. The device according to claim 5, including means for disconnecting said filter from said outlet line and for connecting said filter to a cleaning apparatus and to a sensor for measuring substances removed during cleaning.

8. The device according to claim 7, wherein said filter has a heater.

9. The device according to claim 5, including means for charging said filter with water vapor or water.

10. The device according to claim 1, including a sensor for sensing gas and a sensor for sensing liquid.

11. The device according to claim 10, wherein said gas is methane and wherein said liquid is water.

12. A device for sealing off and monitoring a volume, comprising:
two seals,
support elements spacing said seals apart from one another,
at least one conduit disposed between said seals and said support elements,
said at least one conduit having an inlet opening and an outlet opening for a medium, and
at least one sensor associated with said outlet opening,
said two seals having edges being tightly joined to one another leaving said inlet and outlet openings of said at least one conduit free, and
said support elements being formed of a fluid-permeable, yet flow-hindering material, wherein said support elements have a lesser flow resistance at right angles to said at least one conduit than parallel to said at least one conduit.

13. The device according to claim 12, wherein said support elements are formed of a woven fabric material oriented at right angles to said at least one conduit.

14. The device according to claim 12, wherein said material of said support elements is made up of capillaries oriented at right angles to said at least one conduit.

15. The device according to claim 12, wherein said material of said support elements is made up of tubules oriented at right angles to said at least one conduit.

16. A device for sealing off and monitoring a volume, comprising:
two seals,
support elements spacing said seals apart form one another,
at least one conduit disposed between said seals and said support elements,
said at least one conduit having an inlet opening and an outlet opening for a medium, and
at least one sensor associated with said outlet opening,
said two seals having edges being tightly joined to one another leaving said inlet and outlet openings of said at least one conduit free, and
said support elements being formed of a fluid-permeable, yet flow-hindering material, an outlet line connected to said outlet opening, a line at least partly bypassing said outlet line, and a filter disposed in said bypass line for receiving toxic substances.

17. The device according to claim 16, wherein said filter is a catalytic filter.

18. The device according to claim 16, including means for disconnecting said filter from said outlet line and for connecting said filter to a cleaning apparatus and to a sensor for measuring substances removed during cleaning.

19. The device according to claim 18, wherein said filter has a heater.

20. The device according to claim 16, including means for charging said filter with water vapor or water.

* * * * *